(12) United States Patent
Kastl et al.

(10) Patent No.: US 6,228,307 B1
(45) Date of Patent: May 8, 2001

(54) METHOD AND DEVICE FOR BENDING A COMPONENT MADE OF A THERMOPLASTIC MATERIAL AND THE COMPONENT ITSELF

(75) Inventors: Hans Kastl, Königstein; Ulrich Schenk, Oberursel; Karlheinz Johne, Wiesbaden; Rudolf Majthan, Eschborn, all of (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 09/098,296

(22) Filed: Jun. 16, 1998

Related U.S. Application Data

(63) Continuation of application No. PCT/EP97/00129, filed on Jan. 13, 1997.

(30) Foreign Application Priority Data

Feb. 24, 1996 (DE) ............................................... 196 07 069

(51) Int. Cl.⁷ .............................. B29C 11/08; B29C 53/02
(52) U.S. Cl. .......................... 264/285; 264/292; 264/295; 264/322; 264/327; 264/339; 264/516; 428/35.7; 428/36.9; 425/394
(58) Field of Search ............................... 428/35.7, 36.9; 264/443, 322, 339, 295, 296, 292, 285, 327, 519; 425/394

(56) References Cited

U.S. PATENT DOCUMENTS

| | | | |
|---|---|---|---|
| 3,719,737 | 3/1973 | Vaillancourt et al. | 264/162 |
| 4,073,859 | * 2/1978 | Baumgartner et al. | 264/322 |
| 5,160,685 | * 11/1992 | Moran, Jr. | 264/237 |
| 5,354,533 | * 10/1994 | Antoine | 264/296 |
| 5,407,613 | * 4/1995 | Schulte | 264/25 |
| 5,422,048 | 6/1995 | Kodama et al. | 264/443 |
| 5,597,185 | * 1/1997 | Bray et al. | 285/179 |
| 5,861,200 | * 1/1999 | Rowley | 428/36.9 |

FOREIGN PATENT DOCUMENTS

| | | |
|---|---|---|
| 39 39 352 A1 | 6/1991 | (DE) . |
| 2 702 991 | 9/1994 | (FR) . |
| 63 247020 | 1/1989 | (JP) . |

\* cited by examiner

*Primary Examiner*—Rena L. Dye
(74) *Attorney, Agent, or Firm*—Fish & Richardson, P.C.

(57) ABSTRACT

The invention is directed to a method and a device for bending a component (71) made of a thermoplastic material, and to the component (71) itself, in particular a sleeve-shaped component having a straight shank (72), for use in a personal care appliance such as a dental care, a hair care, a kitchen apparatus or the like. A holding means (70) is provided for supporting the component (71) to be formed to shape, and the component (71) is formed by at least two tools (76, 84, 92) arranged for movement relative to each other, and a heating unit is provided for heating the component (71) in its condition as formed.

15 Claims, 3 Drawing Sheets

METHOD AND DEVICE FOR BENDING A COMPONENT MADE OF A THERMOPLASTIC MATERIAL AND THE COMPONENT ITSELF

This is a continuation of PCT application Ser. No. PCT/EP97/00129, filed Jan. 13, 1997, which claims priority from German application serial number 19607069.4, filed Feb. 24, 1996, (pending).

BACKGROUND OF THE INVENTION

This invention relates to a method and a device for bending a component made of a thermoplastic material, particularly a sleeve-shaped component having a straight shank, and to the component itself that can be formed to shape by this method. The component finds application in a personal care appliance such as a dental care, a hair care, a kitchen apparatus or the like.

Plastic injection molding methods are conventionally used for the manufacture of large quantities of plastic components. The methods enable components of straightforward geometrical design to be manufactured with relative ease and economy. It is difficult or impractical, however, to use the known injection molding methods for the manufacture of geometrically elaborate components with several openings, undercuts or miniature dimensions, for example. An alternative way to manufacture such plastic components formed to an elaborate geometrical shape is to assemble them from several individual parts, each of which is injection-molded separately. However, this manufacturing approach is not only highly complex but also cost-intensive, particularly where large quantities are involved, hence the need to find an alternative to the multi-part manufacturing method for the production of tubular sleeve-shaped plastic parts, for example.

SUMMARY OF THE INVENTION

It is an object of the present invention to provide a method and a device for forming a component made of a thermoplastic material to shape, with the manufacture of an in particular sleeve-shaped component having a straight shank being intended. In the use of this method it is important that essential dimensions such as the cross section of the component or a bore with a diameter amounting to a few tenths of millimeters be maintained. It is a further object of the present invention to provide a component which is manufacturable in accordance with a method of the present invention and which meets the geometrical requirements referred to in the foregoing. The method, the device and the component to be provided should be such that they are economical to perform and manufacture respectively, making them suitable in particular for manufacturing products in very large quantities.

This object is accomplished by the present invention in that it provides a method for bending a component injection-molded as a one-piece construction, that the component to be formed to shape is supported on a holding means, and that the component's section to be formed is shapeable by at least two tools including, for example, an inner and an outer forming tool or a bending tool. The tools are arranged for movement relative to each other, holding the component in its condition as formed until it is subsequently heated to about softening point of the respective plastic by a heating unit. Advantageously, with this method the component to be formed is bent over a forming tool by a tool at room temperature or also at a slightly elevated ambient temperature "in cold condition". To avoid snapback of the component thus bent after the tools are opened, the formed component is stress-relieved by the action of heat. This involves holding the component in the condition as formed and heating it to at least softening point by a heating unit. This advantageously produces a permanent deformation of the integrally made plastic component.

To manufacture a component bent through an angle of 90°, for example, an inner forming tool is used to advantage. The inner forming tool, which defines the inside radius of the component, is at least in partial engagement with the component to be formed when in a stop position. The advantage thereby obtained is that any component to be formed can be brought into a defined position relative to the forming tool.

Once the component to be formed is in engagement with the inner forming tool in a defined stop position, a bending tool advantageously operates to bend the component around the stationary inner forming tool, so that it is only necessary for the bending tool to be moved around the stationary inner forming tool.

Advantageously, the bent component is in contact with the inner forming tool on at least two engagement surfaces. This produces an accurate guidance of the component on the engagement surface, enabling good repeatability of the bending operation. Moreover, the provision of the two engagement surfaces at the beginning and end of the component's section to be formed is highly advantageous because it enables bending of the component to be performed reliably without buckling occurring.

It is an advantage that during the bending operation the bending tool or the outer forming tool executes a rolling motion on the component to be formed. This enables the component to be formed to shape to particular precision with zero wear.

As the forming operation proceeds, the tools execute a linear or arcuate movement. This makes it possible for the tools to travel a minimum amount, ensuring advantageously that the tools are at all times in contact with the component to be formed during the bending operation.

In a further step of the process, the outer forming tool which has not been used yet at this stage is moved up to the bent component.

Advantageously, the inner and the outer forming tool are brought into an essentially snug engagement with the formed component. This produces the advantage of a maximum possible engagement surface of the tools with the component.

Another advantage resides in that the formed component is heatable directly by a forming tool. To this effect, the forming tool is constructed as a heating unit.

By arranging for the holding means to engage on the straight shank of the component, the component is advantageously simply and securely held during the forming process.

In an advantageous further aspect of the present invention, which may also represent an independent invention, it is proposed providing a device for bending a component made of a thermoplastic material, in particular a sleeve-shaped component having a straight shank, particularly for a personal care appliance such as a dental care, hair care, kitchen apparatus or the like. This device includes holding means for supporting the component to be shaped, and the component is shapeable by at least two tools including, for example, an inner and an outer forming tool or a bending tool which are arranged for movement relative to each other. Still further, a heating unit is provided for heating the component in its condition as formed.

According to one aspect of this device, at least one forming tool includes an engagement surface for positioning the component to be formed. This engagement surface may be, for example, a plane surface that registers with an engagement surface of the component to be formed.

Still further, it is proposed providing the forming tools with guide grooves for receiving the component to be formed. By configuring the guide grooves so as to have only a small positive allowance relative to the outside dimension of the component's section to be formed, an accurate guidance of the component on this forming tool is obtained to advantage.

Particularly conveniently, the forming tool is configured as an inner or an outer forming tool, both forming tools having corresponding forming faces. These forming faces ensure accurate engagement of the component to be formed in the tool during the forming operation.

By configuring the corresponding forming faces as sections of a circular arc, forming the component with a circular-arc-shaped section is made possible to advantage.

Advantageously, the forming face of the inner forming tool has a smaller radius than the forming face of the outer forming tool. The radius of the inner forming face then corresponds to the inner radius of the component as formed to its final shape.

To obtain a stress-free condition of the cold formed component, at least one forming tool is heatable advantageously. Thus the inner forming tool, for example, is heated following cold forming, or the outer forming tool is heated and brought into engagement with the formed component following its cold forming.

Advantageously, both forming tools are heatable. This enables the formed component to be heated rapidly and directly by both tools.

In another aspect provision is made for at least one forming tool to be adapted to be loaded by a spring. Advantageously, the outer forming tool is spring-loaded because this is the one that needs to be adjusted to the component which recedes to the forming face of the inner forming tool following heating of the formed component.

An alternative proposal involves the provision of a separate heating unit, in particular an infrared, laser or similar heating unit. This has the advantage of enabling the forming tool and the heating unit to be constructed as separate parts.

The holding means for supporting the straight shank of the component to be formed is advantageously configured as a mounting mandrel, a collet chuck or a similar component.

In a particularly advantageous further aspect of the present invention, which may also represent an independent invention, a component is provided that is formed to shape in accordance with the features of the method identified in the foregoing or in the device identified in the foregoing. Using the above features, this component can be manufactured in large quantities particularly advantageously and economically.

In an aspect of the present invention it is proposed configuring the component as an essentially hollow cylindrical body which is straight prior to bending and has a shank, a middle section to be formed to shape, and a frusto-conical tip. A component of this type affords ease of manufacture as an injection-molded part and is advantageously suitable for forming according to the method referred to in the foregoing or in a device of the type referred to in the foregoing.

In another aspect it is proposed providing a shank with a larger diameter than the component's middle section to be formed. This has the advantage of defining a stable section of the component on which the holding means can engage simply and securely.

A particularly advantageous embodiment of the component provides for engagement surfaces of frusto-conical shape in the areas of transition between the shank and the middle section and between the middle section and the tip, with the tips of these truncated cones pointing at each other. This configuration of the engagement surfaces enables a positionally accurate engagement on the sections at the beginning and at the end of the middle section to be formed.

In a further aspect, a component with a stepped, continuous bore is provided. This advantageously enables a dental cleansing device to be guided in this component.

Advantageously, this stepped bore has its smallest diameter in the tip of the component so that the dental cleansing device provided in the component can be guided in the tip with minimum possible play.

The component is made of polycarbonate, polypropylene, a similar plastic material or the like. Hence provision is made advantageously for a particularly tough plastic that displays little tendency to brittle fracture while at the same time being resistant to chemicals. Furthermore, the softening point with these plastics lies below the shrinkage temperature.

Further features, advantages and application possibilities of the present invention will become apparent from the subsequent description of embodiments illustrated in more detail in the accompanying drawings. It will be understood that any single feature and any combination of single features described and/or represented by illustration form the subject-matter of the present invention, irrespective of their summary in the claims and their back-reference.

DETAILED DESCRIPTION OF THE INVENTION

Figure 1:
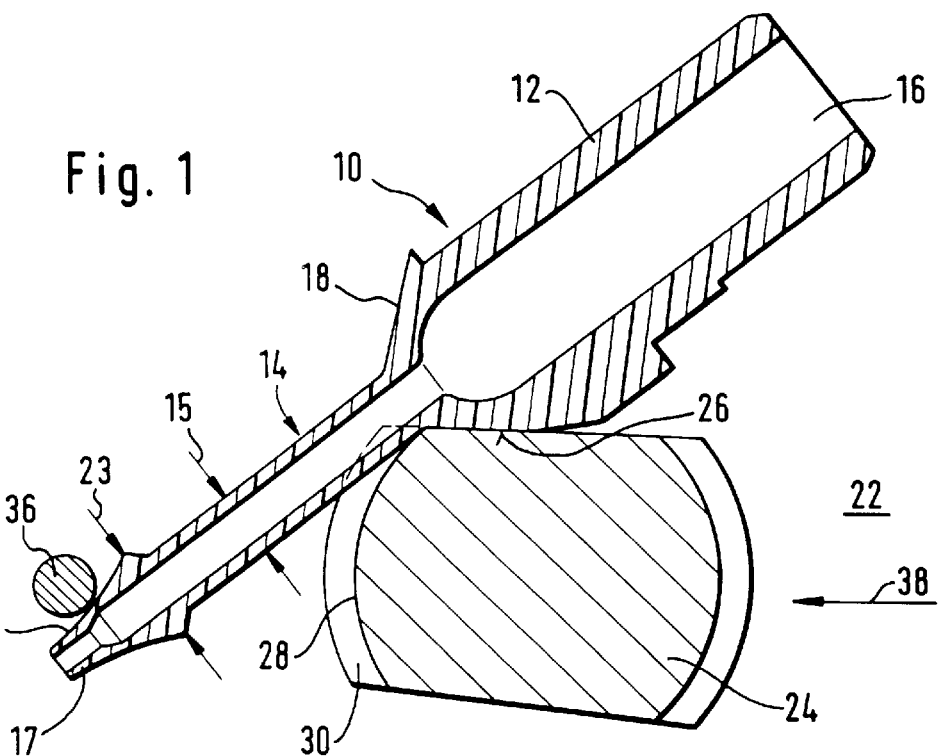
FIG. 1 is a sectional view of a straight component prior to forming with two forming tools.

A sleeve-shaped and essentially rotationally symmetric component 10 (FIG. 1) is comprised of a straight shank 12 and an adjoining section 14 to be formed of a reduced diameter 15. Adjoining the end of the section 14 to be formed is a conical tip 17. In the transition area between the shank 12 and the section 14 to be formed is a frusto-conical engagement surface 18. The largest diameter 23 of the conical tip 17 is larger than the diameter 15 of the section 14. Extending through the full length of the component 10 is a stepped bore 16 having its smallest diameter in the area of the tip 17 of the component 10. The component 10 may be injection molded from plastic as a one-piece construction, for example.

An inner forming tool 24 provides the stop for the inside radius of the section 14 to be formed and is essentially shaped in a circular-disk-type configuration having a straight engagement surface 26. The circular-arc-shaped sections of this tool 24 provide respective forming faces 28 having an equally circular-arc-shaped guide groove 30 for receiving the section 14 to be formed. The component 10 to be formed is fixedly located in the position shown by a holding device not illustrated in this Figure, and the forming tool 24 is moved towards the component 10 in the direction 38 up to the stop position 22 shown, so that the engagement surface 26 of the tool 24 comes to rest against the engagement surface 18 of the component 10.

A further forming tool, as for example a roller-shaped bending tool 36, is placed against a frusto-conical engagement surface 20 at the tip 17.

Figure 2:
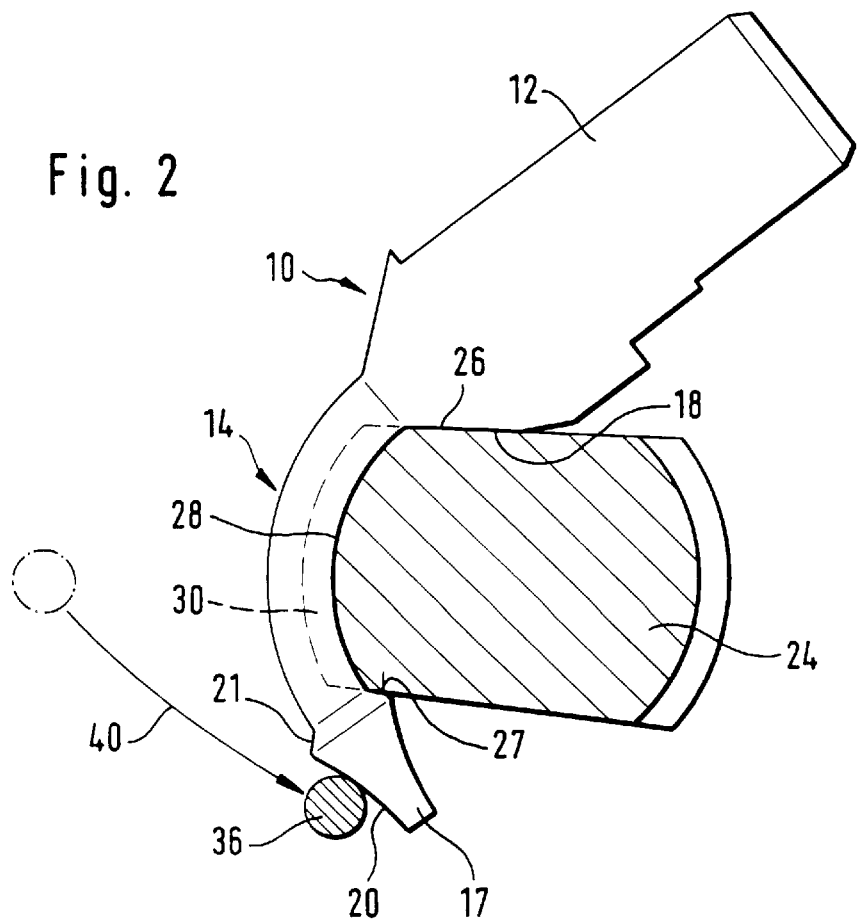
FIG. 2 is a view, partly in section, of a component subsequent to forming with two forming tools.

This bending tool 36 (FIG. 2) is moved towards the forming tool 24 using an arcuate motion in the direction 40, hence bending the section 14 to be formed into the guide groove 30 until it engages the forming face 28 of the forming tool 24. As this forming operation proceeds, the straight shank 12 remains in its initial position so that the frusto-conical engagement surface 18 of the component 10 rests on the plane engagement surface 26 of the forming tool 24. On completion of the bending operation, the equally frusto-conical engagement surface 21 at the tip 17 abuts the second straight engagement surface 27 of the tool 24. During bending, the bending tool 36 rolls off along the conical forward engagement surface 20 of the tip 17.

Figure 3:
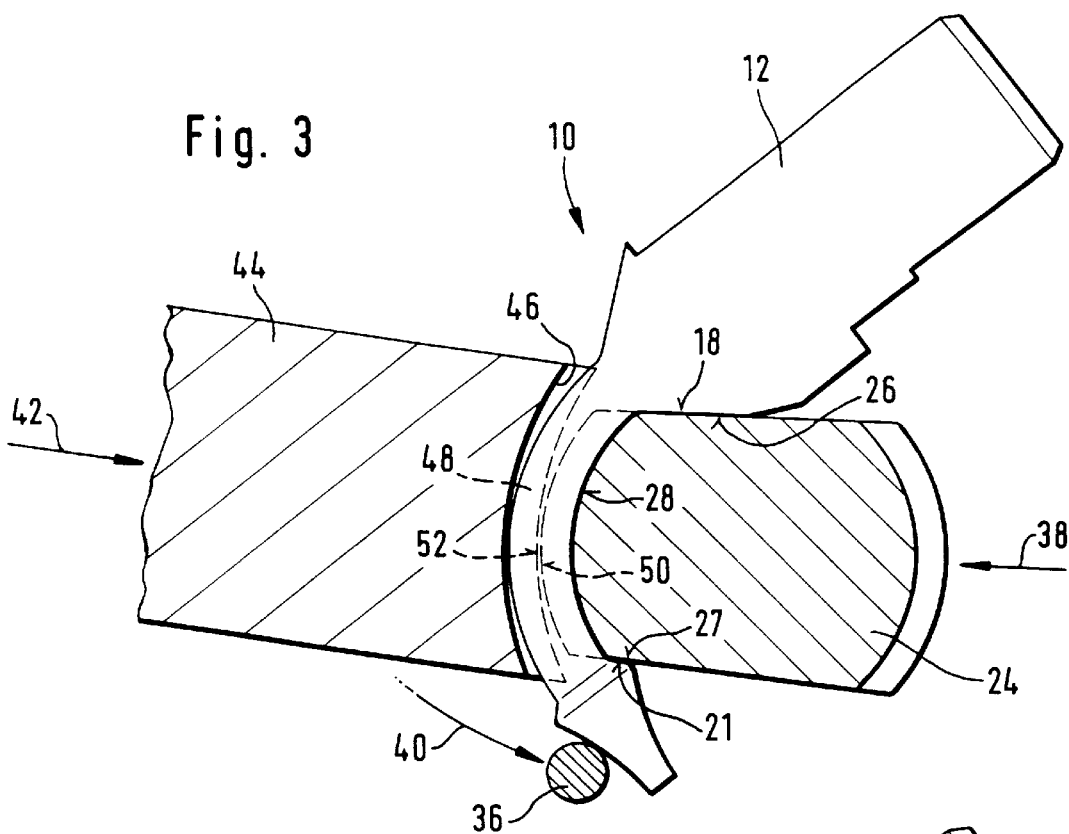
FIG. 3 is a view, partly in section, of a component subsequent to forming with three forming tools.

Following bending (FIG. 3), the bending tool 36 first remains in its end position, holding the formed component into engagement with the forming face 28 of the inner forming tool 24. Considering that the component 10 is bent at room temperature or at a slightly elevated temperature not exceeding 50° C., approximately, the prestress present in the component 10 is relieved by heating the component in bent condition. To this effect, an outer forming tool 44 is caused to approach the component 10 in the direction of movement 42. The outer forming tool 44 possesses likewise a forming face 46 and a guide groove 48 as does the inner forming tool 24. The corresponding engagement surfaces 18, 26 and 21, 27 are maintained in relative contact. After the component 10 is stress-relieved, the tools 24, 36 and 44 are moved away from the component 10 in opposition to the directions of movement 38, 40 and 42 shown.

Figure 4:
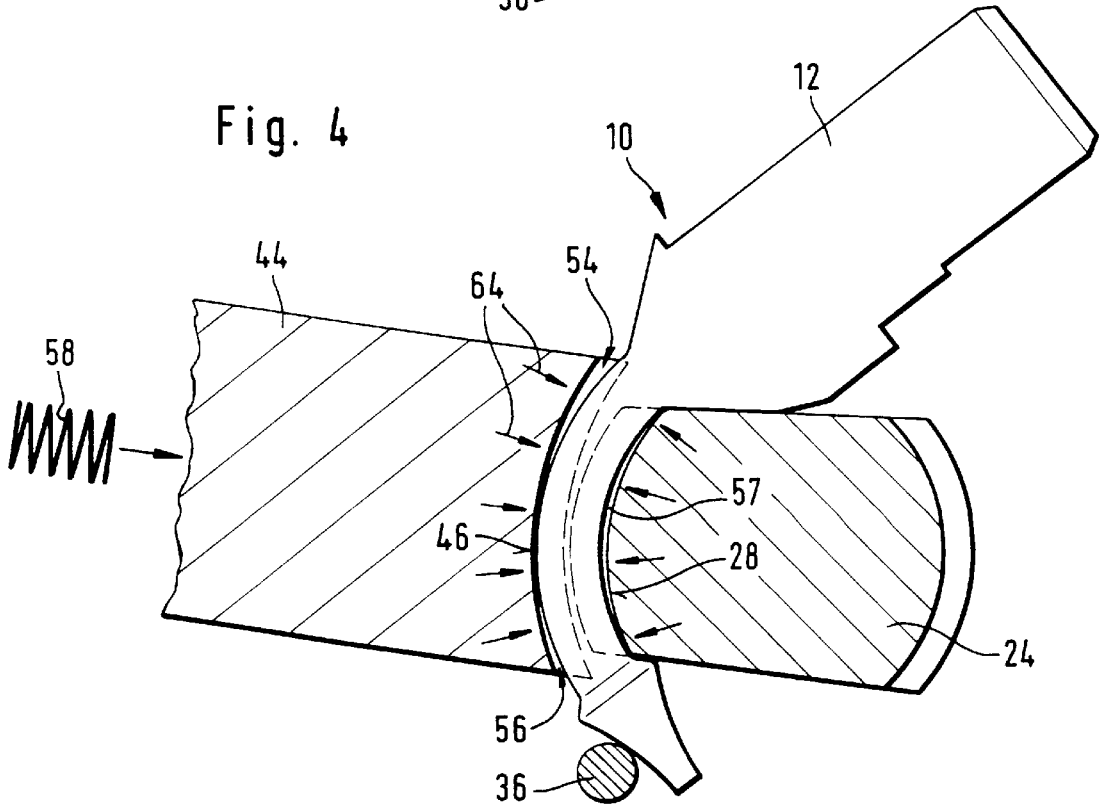
FIG. 4 is a view similar to FIG. 3, but illustrating a compression spring and the radiation of heat.

To introduce heat (FIG. 4) into the formed component 10, the inner and outer forming tools 24 and 44 may be heated directly, for example. This enables heat to be transferred by radiation 64 from the forming faces 28 and 46 to the formed section of the component 10. Because the cold-formed component 10 has not reached its final shape as yet, gaps 54, 56 and 57 occur between the component 10 and the forming tools 24, 44 prior to heating. After the component 10 is heated to the temperature necessary for softening the plastic, the force of a compression spring 58 acts to move the outer forming tool 44 in the direction of the inner forming tool 24. As a result, the arcuate inner section of the component 10 snugly engages the forming face 28 of the tool 24, filling the gap 57.

The main flow of heat during heating the formed component 10 takes place at the locations where the forming tool engages the component, producing an increased heat transference from the inner forming tool 24 to the component in the outer edge areas of the forming face 28, while heat transference from the outer forming tool 44 to the component 10 is greater in a middle section than in the edge areas.

Figure 5:
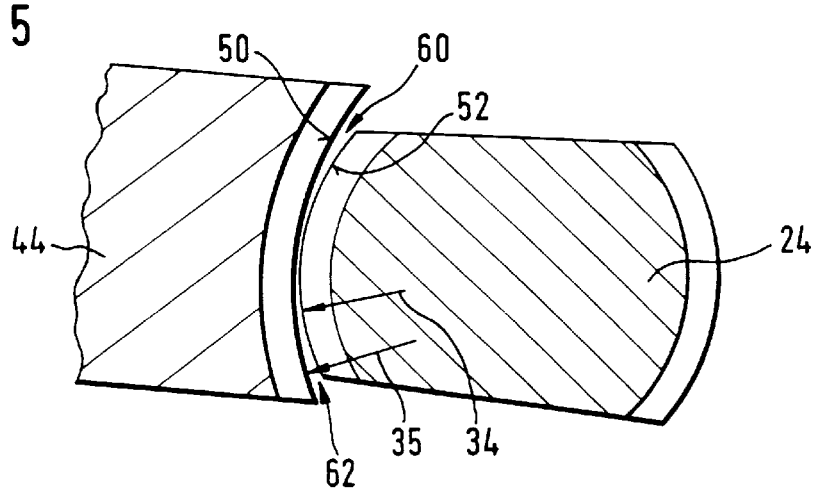
FIG. 5 is a sectional view of two forming tools in engaged position.

The two corresponding end surfaces 50, 52 (FIG. 5) of the tools 24, 44 have different radii 34, 35. As a result, the end surfaces 50, 52 engage with each other only in a middle section of the two tools 24, 44, producing a respective wedge-shaped gap 60, 62 in the two outer sections thereof.

Figure 6:
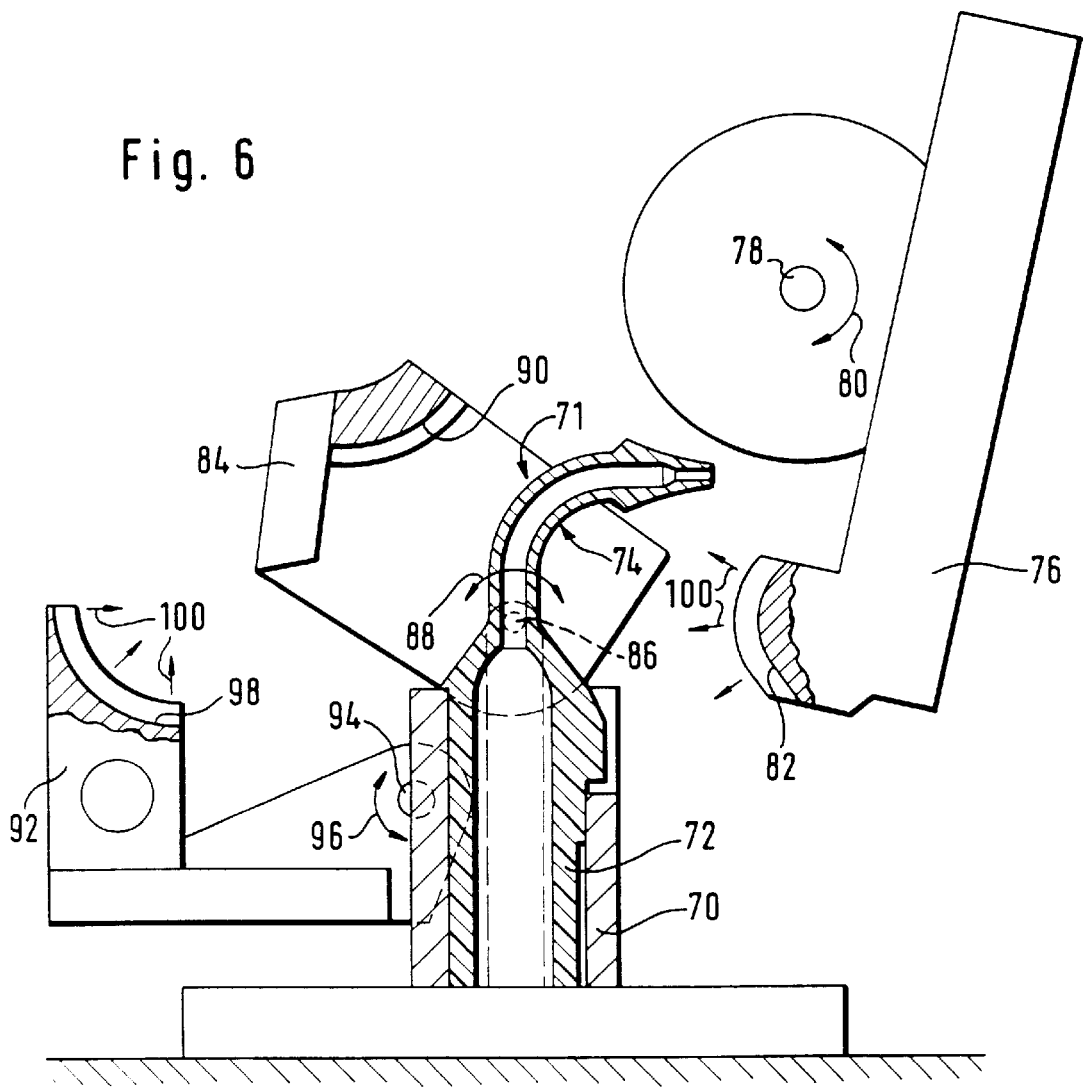
FIG. 6 is a schematic view, on a reduced scale, of a device of the present invention.

A possible embodiment of a device of the present invention (FIG. 6) is based on a holding means 70 that embraces the shank 72 of a component 71 to be formed and beyond which the section 74 to be formed protrudes. An inner forming tool 76 is mounted for rotation about an axis 78 in the direction of rotation 80. A forming face 82 for producing the inner bending radius is provided at the end of the tool 76.

A bending tool 84 is mounted for rotation about an axis 86 and is movable in either direction of rotation 88. Its forming face 90 is brought into engagement with the conical tip of the section 74 to be formed by using a pivotal motion.

An outer forming tool 92 is pivotal about an axis 94 and movable in the direction of rotation 96. Its forming face 98 is movable into engagement with the outer bent portion of the section 24 as formed using a pivotal motion.

The forming faces 82 and 98 are provided as a heating unit, radiating heat 100 in the direction of the formed component 71.

What is claimed is:

1. A method for bending a component made of thermoplastic material comprising:

arranging the component in a holding device;

shaping the component at a first temperature into a shaped condition by means of at least two tools including a first tool and a second tool by moving the first tool towards the second tool;

causing the first and second tools to hold the component in its shaped condition; and after shaping the component and while the first and second tools hold the component in its shaped condition, heating the component above the first temperature to about the softening point of the plastic by a heating unit associated with at least one of the first and second tools.

2. The method of claim 1, further comprising selecting an inner forming tool as the first tool and selecting one of an outer forming tool and a bending tool as the second tool.

3. The method of claim 2, wherein said arranging step involves bringing the inner forming tool in partial engagement with the component.

4. The method of claim 2, wherein the second tool is the bending tool and said moving step involves bending the component by means of the bending tool around the inner forming tool.

5. The method of claim 4, wherein said bending step involves bringing the component in contact with at least two engagement surfaces of the inner forming tool.

6. The method of claim 4, further comprising moving the outer forming tool up to the bent component.

7. The method of claim 6, further comprising bringing the inner and outer forming tools into an essentially snug engagement with the bent component.

8. The method of claim 6, wherein the heating step comprises heating the component by at least one of said inner and outer forming tools.

9. The method of claim 8 wherein the step of heating step comprises heating both of said first and second tools.

10. The method of claim 1, wherein said moving step involves linearly guiding one of the first and second tools toward the other of said first and second tools.

11. The method of claim 1, further comprising causing the holding device to engage on a shank of the component.

12. The method of claim 1, further comprising selecting the first and second tools from the group consisting of an inner forming tool, an outer forming tool and a bending tool.

13. The method of claim 1, wherein the shaping step involves shaping a section of the component.

14. A method for bending a component made of thermoplastic material comprising:

arranging the component in a holding device;

shaping the component into a shaped condition by means of at least two tools including a first tool and a second tool by moving the first tool towards the second tool, wherein said shaping involves causing the second tool to execute a rolling motion on the component;

causing the first and second tools to hold the component in its shaped condition; and while the first and second tools hold the component in its shaped condition, heating the component to about the softening point of the plastic by a heating unit associated with at least one of the first and second tools.

15. A method for bending a component made of thermoplastic material comprising:

arranging the component in a holding device;

shaping the component into a shaped condition by means of at least two tools including a first tool and a second tool by moving the first tool towards the second tool, wherein said moving comprises arcuately guiding one of said first and second tools toward the other of said first and second tools;

causing the first and second tools to hold the component in its shaped; and while the first and second tools hold the component in its shaped condition, heating the component to about the softening point of the plastic by a heating unit associated with at least one of the first and second tools, wherein the first and second tools are selected from the group consisting of an inner forming tool, an outer forming tool and a bending tool.

* * * * *